No. 769,450. PATENTED SEPT. 6, 1904.
E. PETERS.
NUT PRESS.
APPLICATION FILED MAY 20, 1903.
NO MODEL. 5 SHEETS—SHEET 1.

Witnesses:
Arthur Zumper
Edward Ray

Inventor:
Ernst Peters
by his attorney
Frank v. Briesen

No. 769,450. PATENTED SEPT. 6, 1904.
E. PETERS.
NUT PRESS.
APPLICATION FILED MAY 20, 1903.
NO MODEL. 5 SHEETS—SHEET 3.

Witnesses:
Inventor:
Ernst Peters
by his attorney

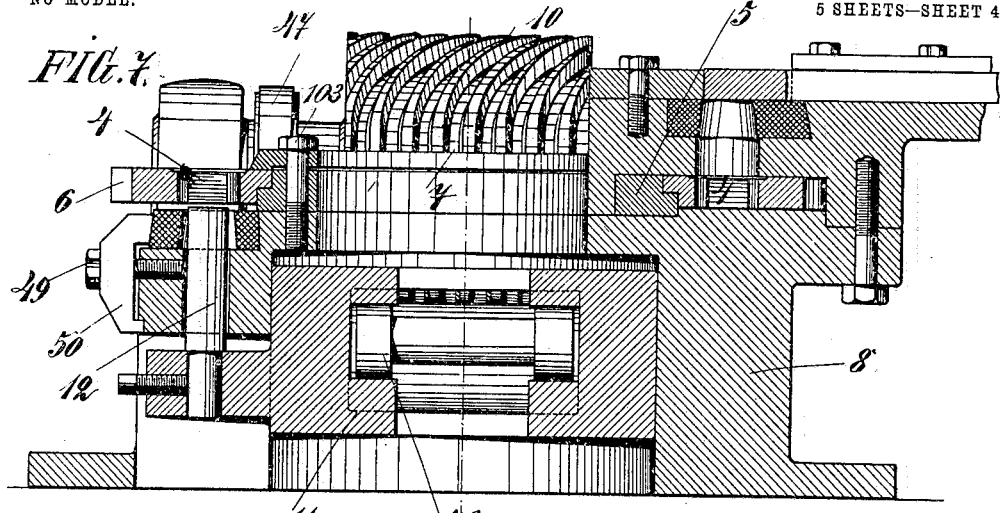
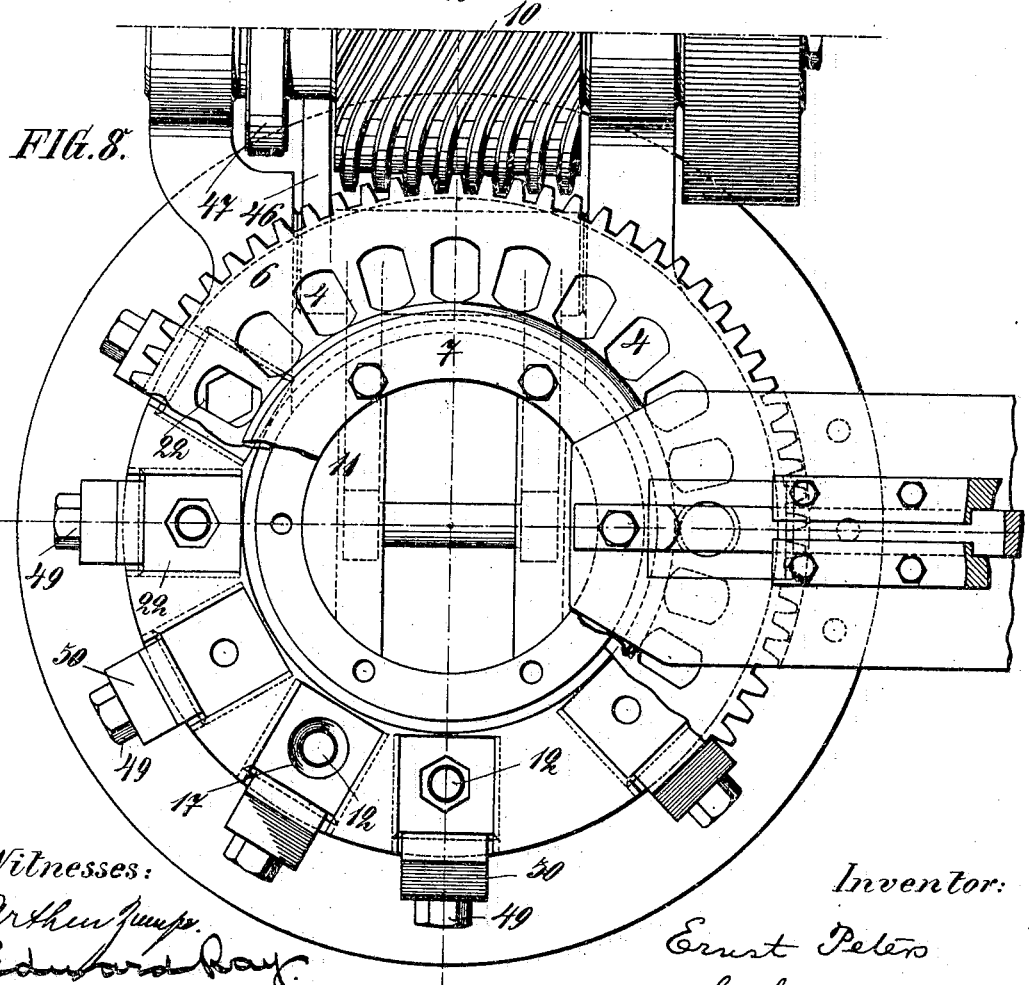

No. 769,450. PATENTED SEPT. 6, 1904.
E. PETERS.
NUT PRESS.
APPLICATION FILED MAY 20, 1903.
NO MODEL. 5 SHEETS—SHEET 5.
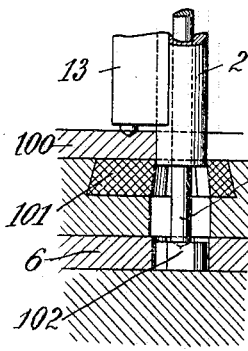
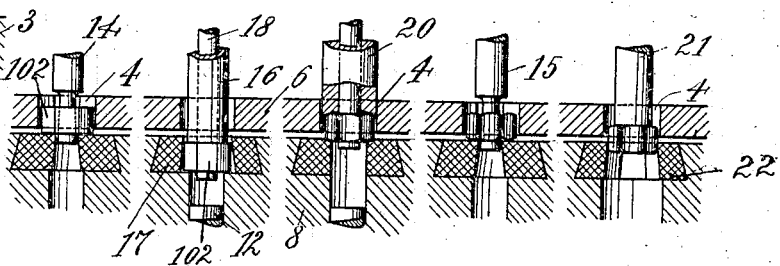
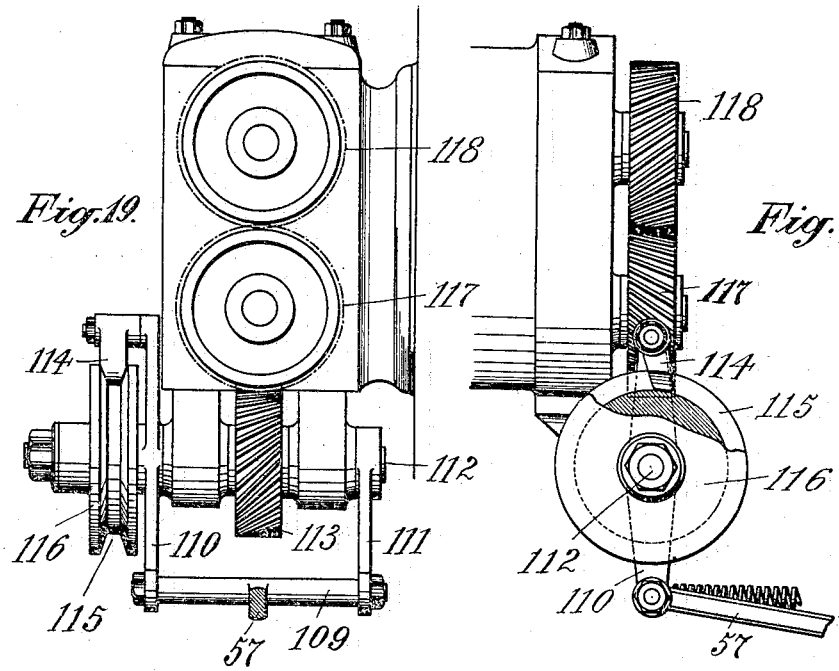
Witnesses: Inventor
Arthur Quinne Ernst Peters
Fred. Unfricht by Frank Biesen Atty.

No. 769,450. Patented September 6, 1904.

UNITED STATES PATENT OFFICE.

ERNST PETERS, OF DÜSSELDORF, GERMANY.

NUT-PRESS.

SPECIFICATION forming part of Letters Patent No. 769,450, dated September 6, 1904.

Application filed May 20, 1903. Serial No. 157,918. (No model.)

*To all whom it may concern:*

Be it known that I, ERNST PETERS, a citizen of the German Empire, residing at Düsseldorf, Germany, have invented new and useful Improvements in Nut-Presses, of which the following is a specification.

This invention relates to an improved machine for the uninterrupted pressing of nuts in such a manner that the treatment of the raw material is performed successively by different tools or machine parts.

Figure 1:
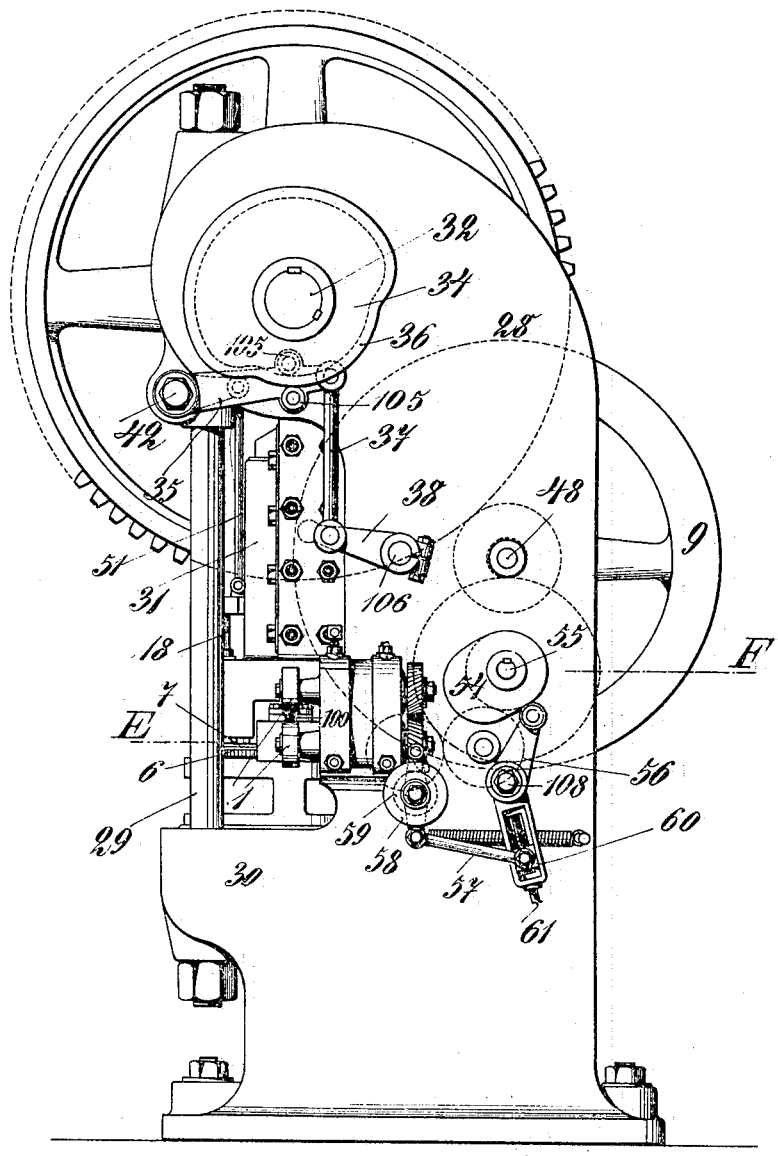
Figure 2:
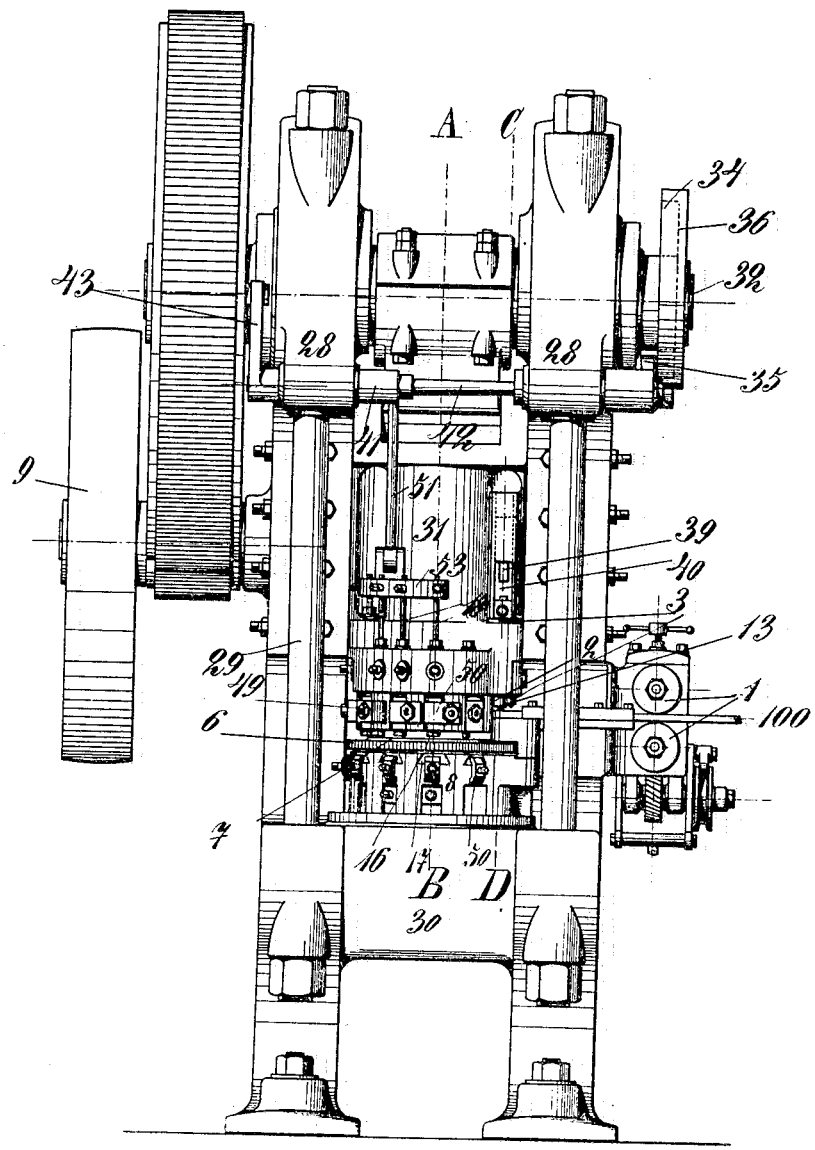
Figure 3:
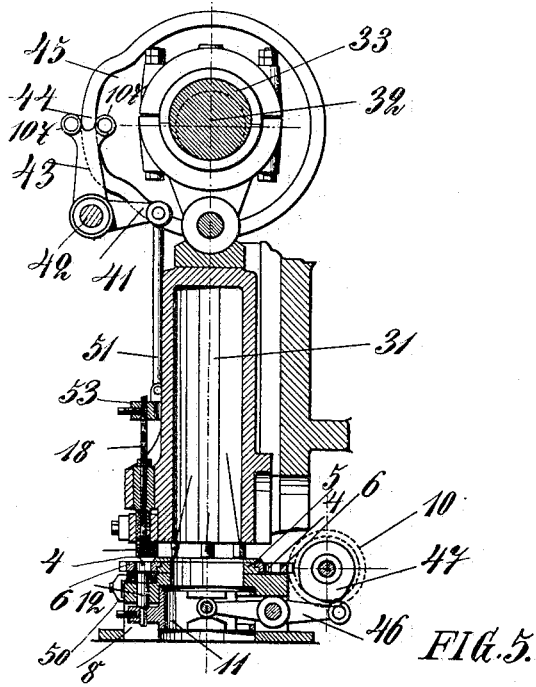
Figure 4:
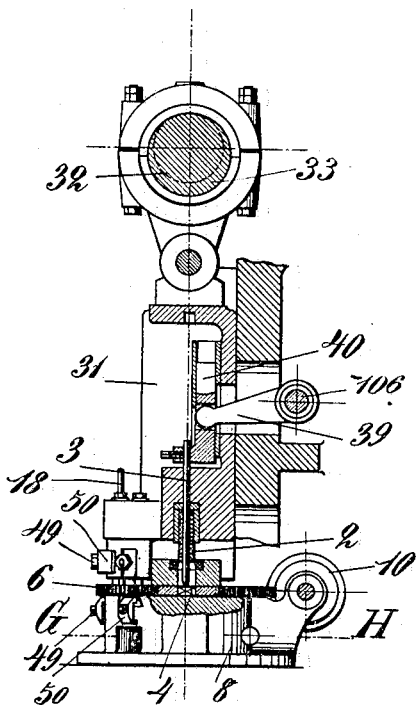
Figure 5:
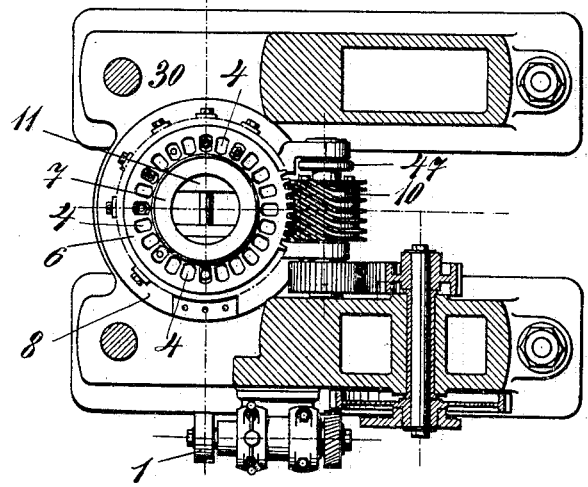
Figure 6:
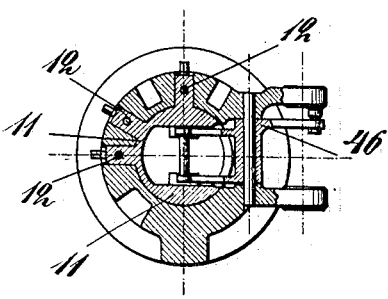

In the accompanying drawings, Figure 1 is a side view of the press; Fig. 2, a front view thereof; Fig. 3, a section on line A B, Fig. 2, with the lower part of the frame omitted; Fig. 4, a similar section on line C D, Fig. 2; Fig. 5, a horizontal section on line E F, Fig. 1; Fig. 6, a horizontal section on line G H, Fig. 4; Fig. 7, an enlarged cross-section through the stamping mechanism; Fig. 8, a plan thereof. Figs. 9, 11, 13, 15, 17, 18 are sectional elevations showing the consecutive nut-forming devices. Figs. 10, 12, 14, 16 are plans of the blanks illustrated in Figs. 9, 11, 13, 15, respectively; Fig. 19, a detail side view of the feed-rollers, and Fig. 20 a detail front view thereof.

A flat metal bar 100 is fed by rollers 1 under a vertically-movable tubular cutting-plunger 2, that forces the bar into a fixed matrix 101, by means of which a blank 102 of the desired size is cut off, Fig. 9. Through the tubular plunger 2 passes an independently-movable pin or ejector 3, that pushes the blank 102 into one of a number of perforations 4, formed within the body of a horizontal intermittently-rotatable feed disk, collar, or wheel 6, provided with a toothed rim and located beneath matrix 101. After the blank has thus become seated the pin 3 is raised, together with the plunger 2. The disk 6 is rotatably seated upon an annular hub or ring 5 and is slightly overlapped by an annular top plate 7, said plate and hub being secured to a cylinder 8 by bolts 103, Fig. 7. A worm 10, engaging the toothed rim of disk 6 and driven by the pulley 9, imparts an intermittent rotary motion to the collar 6, so that the collar carries with it the material which has fallen into the holes 4 until it arrives successively under the different stamps, matrices, and spindles and worked until the finished product drops out of the collar or ring 6. In finishing the edges of the nut the latter is pressed into the matrix 17, arranged beneath ring 6, and is afterward raised out of said matrix by a suitable lifter 12, which is adapted to be projected into the matrix. For this purpose the lifter is connected to a piston 11, vertically movable within cylinder 8.

Fig. 9 shows how the material is cut by the cutting-plunger 2 and depressed by the inclosed pin 3, whereupon the material which goes to form the succeeding blank is dented by a punch 13, situated near the cutter 2, as shown. For this purpose the punch indents the material suitably for the succeeding reception of the point of the pin 3. In this way I avoid perforating the material out of its center. The separated blank is carried by ring 6 under a punch 14, by means of which the blank is perforated. The punch is somewhat conically formed to insure its better cutting.

After the punching the nuts are freed from burs. For this purpose the punched material is placed under the tubular shaping-stamp 16, which on descending presses the nut out of the ring 6 and into the stationary die or matrix 17 in the lower frame. The matrix 17 is perforated for the reception of the nut. When doing heavy work, the stamp or the matrix can be made to cut only two edges; but it may also give the nut its four or six sided form, as shown in the drawings. In order to prevent the hole from being pressed in when the nut is being formed and during other processes and for the purpose of holding the nut centrally, the punches 16 and 20 are also supplied with inclosed independently-movable pins or spindles 18, which engage into the holes of the nuts before the stamp acts on them.

When the nut has passed through the punching and pressing mechanism or been pressed through the matrix 17 and raised by the bolt or pin 12, the ring 6 carries it under the stamper or edging-punch 20, which takes off the burs, rounds off the edges, and gives it its facets, Figs. 15 and 16. In order to obtain as clean a hole as possible, the nut is now put under the interior finishing-punch 15, Fig. 17, and the exterior finishing-punch 21, Fig. 18. The last plunger 21 and matrix 22 serve to shape any nuts that may have been formed imperfect. From the matrix 22 the finished product drops out of the machine.

The press itself is formed of the frame 28, the projecting upper part of which is connected with the lower frame 30 by means of supports 29. The motion is imparted to the stamp-slides 31 by the eccentric 33, which turns on the shaft 32. The sliding carriage 31, which carries the press, punch, and forming-stamp, runs in slide-supports. As the spindle 3, which depresses the cut material, requires a long stroke, it is driven by the eccentric 34 on the driving-shaft 32. The rollers 105 of the arm 35, pivoted to the frame, engage the flange 36 of the cam 34. Thus the arm 35 is worked up and down, according to the form of the latter and transmits motion to the arms 38 and 39, fast on a common shaft 106, by means of the rod 37. The arm 39 engages into a recess in the slide 40 and moves it up and down, Figs. 1 and 4. The rising-and-falling motion of the sliding pin 18, which may be let into a cross piece or projection 53, and which prevents the hole from being pressed in, is effected by means of the rod 51 and the arm 41, which is fixed on the shaft 42. On its other extremity this shaft carries the arm 43, which is moved to and fro by the rollers 107, running on the flange 44 of the cam 45. The nut is raised by the double arm 46, which is actuated by the cam 47, which in its turn is driven by cog-wheels on the driving-shaft 48. The piston 11 is thereby raised, and the pins 12 push up the nuts, which are displaced or moved onward by the ring 6. In order to insure the ring 6, which is intermittently driven by a worm 10, remaining stationary during the process of pressing, punching, and cutting, the worm is partly straight-grooved, while the inclined parts are suited for moving the ring 6 the distance between the centers of adjoining holes 4 at each rotation of the worm, Figs. 5, 7, and 8. The feed-rollers 1, Fig. 1, are driven by the eccentric 54 on the shaft 55, which receives its motion from the shaft 48. A bell-crank 56, turning on pivot 108, is oscillated by the eccentric 54. The lower arm of lever 56 carries a screw-bolt 61, which is engaged by a nut 60. To this nut is pivoted one end of a link 57, the other end of which is provided with a cross-piece 109. This cross-piece is pivoted to a pair of levers 110 111, loosely mounted upon the shaft 112 of toothed wheel 113. Lever 110 is provided with a second arm carrying a tapering dog 114, that engages a peripheral conical groove 115 of a pulley 116, secured to shaft 112. The gear-wheel 113 engages gear-wheel 117, fast on the shaft of the lower feed-roller, which in turn meshes into a gear-wheel 118, fast on the shaft of the upper feed-roller. By this construction the feed-rollers are turned sufficiently to advance enough material for one nut. In order to obtain different lengths of iron, the rod 57 can be adjusted by the bolt 61 in the arm 56. If the nut 60 is forced toward the axis of the arm by the screw 61, the feed-rollers make a smaller rotation than is the case when the nut is set at the extreme end of the arm.

The individual tools or machine parts are inserted through slots in the frame and secured by means of an adjustable screw-bolt 49 and a binder 50, so that they can easily be interchanged.

What I claim is—

1. In a nut-press, an intermittently-rotatable feed-disk having a series of perforations, combined with a fixed matrix above the disk, a tubular cutting-plunger adapted to enter the top of the matrix and to cut off the blank, means for depressing the plunger, a pin inclosed by the plunger, and means for projecting the pin through the plunger, substantially as specified.

2. In a nut-press, an intermittently-rotatable feed-disk having a series of perforations, combined with a vertically-movable tubular shaping-stamp on one side of the disk, an inclosed independently-movable pin adapted to be projected into the disk-perforation, a stationary die on the other side of the disk, and a vertically-movable lifter adapted to be projected through said die, substantially as specified.

Signed by me at Düsseldorf, Germany, this 2d day of May, 1903.

ERNST PETERS.

Witnesses:
WILLIAM ESSENWEIN,
PETER LIEBER.